May 28, 1929.  F. G. WHITTINGTON  1,715,343
WINDSHIELD WIPER
Original Filed Feb. 9, 1924  2 Sheets-Sheet 1
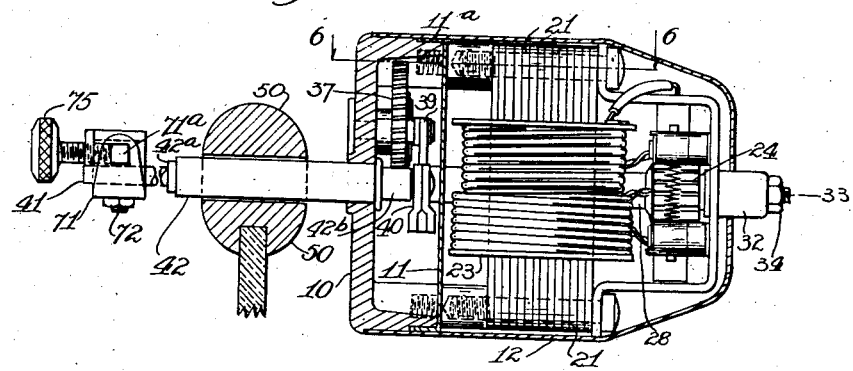
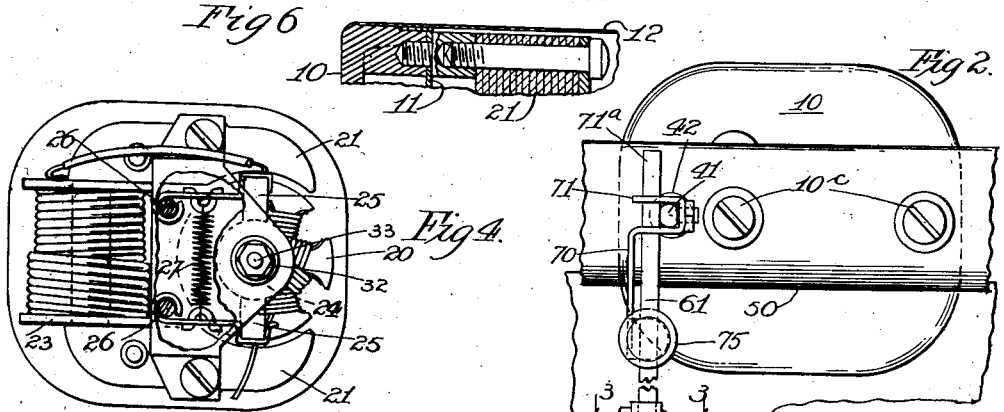
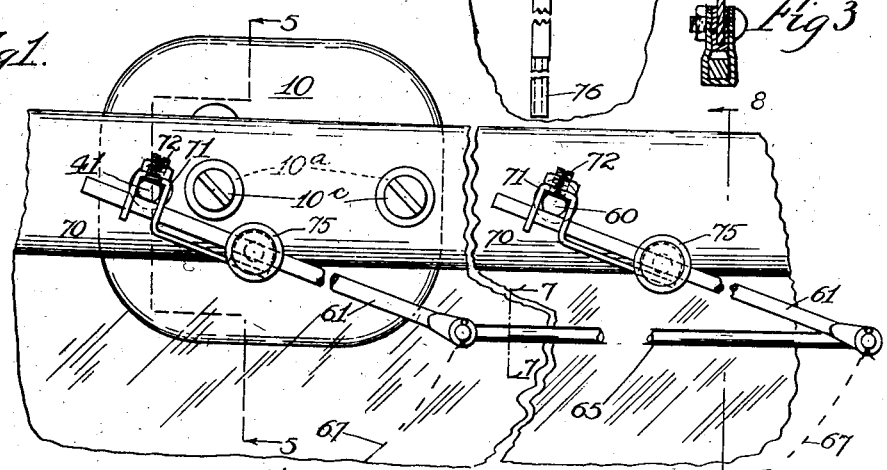
Witness,
A. C. McKnight
Inventor:
Frederik G. Whittington.
by Burton & Burton
his Attorneys.

May 28, 1929.  F. G. WHITTINGTON  1,715,343
WINDSHIELD WIPER
Original Filed Feb. 9, 1924  2 Sheets-Sheet 2
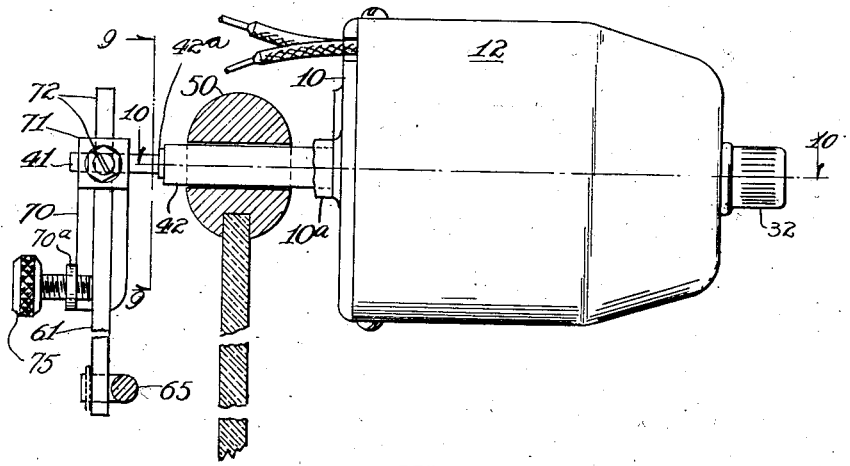
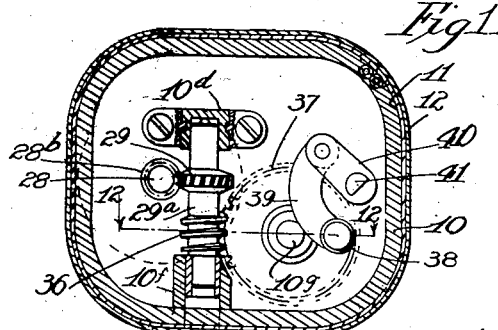
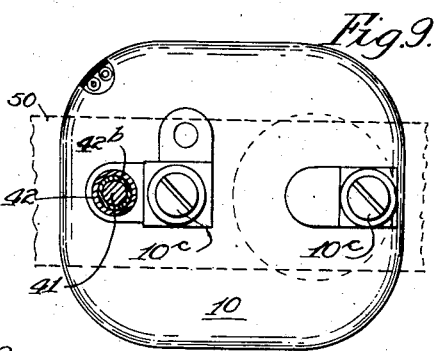
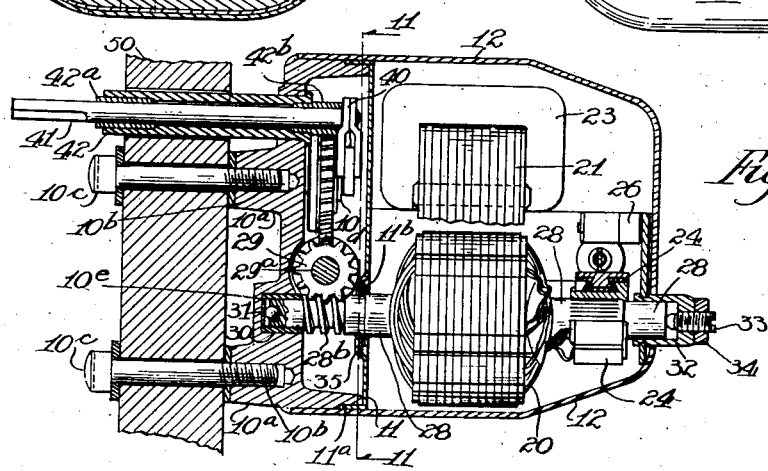
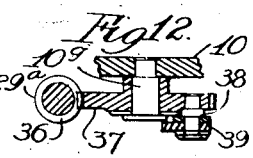
Inventor:
Frederick G. Whittington
by Burton & Burton
his Attorneys.

Patented May 28, 1929.

1,715,343

UNITED STATES PATENT OFFICE.

FREDERIK G. WHITTINGTON, OF EVANSTON, ILLINOIS, ASSIGNOR TO STEWART-WARNER SPEEDOMETER CORPORATION, OF CHICAGO, ILLINOIS, A CORPORATION OF VIRGINIA.

WINDSHIELD WIPER.

Application filed February 9, 1924, Serial No. 691,592. Renewed April 25, 1929.

The purpose of this invention is to provide an improved construction of windshield wiper and motor for operating the same, adapted to be mounted on the windshield. It consists in the elements and features of construction shown and described, as indicated in the claims.

In the drawings:

Figure 1 is an outside or front elevation of a windshield and motor-operated wiper mounted thereon embodied in this invention.

Figure 2 is a similar view showing a slight modification in respect to the form of the wiper element.

Figure 3 is a section at the line, 3—3, on Figure 2.

Figure 4 is a rear end elevation of the motor with the motor casing removed and the rear journal bearing bracket broken away to disclose interior parts.

Figure 5 is a vertical section at the line, 5—5, on Figure 1, only the casing element of the motor being shown in section, the content being shown in side elevation.

Figure 6 is a section at the line, 6—6, on Fig. 5.

Figure 7 is a detail section at the line, 7—7, on Figure 1.

Figure 8 is a section at the line, 8—8, on Fig. 1, cutting only the windshield, the encased motor being shown in elevation.

Figure 9 is a section at the line, 9—9, on Fig. 8.

Figure 10 is a section at line 10—10 on Fig. 8.

Figure 11 is a section at line 11—11 on Fig. 10.

Figure 12 is a section at the line 12—12, on Figure 11.

The construction shown in the drawings comprises an electric motor and mechanism actuated thereby for vibrating a wiper member over the windshield glass. The electric motor and the train of mechanism leading to the shaft by which the wiper member is vibrated are respectively contained in the two compartments of a case which is partitioned between said compartments so that the compartment containing the train is grease-tight for constituting a lubricant chamber from which the lubricant will not escape into the other compartment in which the electric motor with its windings is contained. This casing comprises three parts, first, the die cast mounting member, 10, adapted at one side as hereinafter described for mounting on the windshield frame, and open at the opposite side except as closed grease-tight by the second part,—the partition, 11, and third, the motor enclosing member, 12, which is a cup-shaped sheet metal stamping. The mounting member, 10, of the casing has two exteriorly projecting bosses, 10$^a$, which are bored and tapped as seen at 10$^b$ for receiving the mounting bolts, 10$^c$, 10$^c$, set through the upper horizontal bar of the windshield frame for clamping the entire casing rigidly to said bar. The said mounting member, 10, oblong with rounded corners, is peripherally rabbeted at the margin of its side opposite said bosses for receiving a peripheral flange, 11$^a$, with which the partition, 11, is provided for fitting telescopically about the mounting member to effect a safe grease-tight joint. Said mounting member is also rabbeted peripherally for receiving outside the flange, 11$^a$, of the partition, 11, the open end of the cup-shaped motor enclosing member, 12, which similarly makes a close telescopic joint both with the member, 10, and the flange, 11$^a$, of the partition, 11.

The motor is constructed along conventional lines in general, comprising (a) the rotating armature, 20; (b) the fixed field member comprising a laminated core member consisting of multiplicity of laminæ, 21, forming the magnetic poles, 22—22, with the field windings shown at 23; (c) the commutator seen at 24, and (d) commutator brushes, 25—25, pivotally mounted at 26—26 and connected for holding them against the rotating commutator, 24, by means of a contractile coil spring, 27. The armature shaft, 28, obtains journal bearing at 10$^e$ in the mounting plate, 10, wherein a steel bushing, 30, is inserted to afford said journal bearing and wherein there is also provided an end thrust ball bearing, 31. At the opposite end said armature shaft is provided with a journal bearing, 32, mounted in the head of the case member, 12, and having set through its outer end an adjustable thrust bearing screw, 33, provided with a jam nut, 34; the construction as comprising the thrust bearings, 31 and 33, being adapted to prevent endwise movement, and to take up from time to time the wear which if not compensated by adjustment would tend to make the motor noisy.

The partition, 11, is apertured to permit the shaft, 28, to extend grease-tight through it, being provided at the aperture with a packing gasket, 35, which is accommodated in a slight depression struck in the partition, 11, as seen at 11$^b$ around the shaft aperture. The gear train from the armature shaft, 28, comprises a worm, 28$^b$, on said shaft which meshes with a worm gear, 29, on a shaft, 29$^a$, journaled in the bearings, 10$^d$ and 10$^f$, projecting inwardly from the mounting member, 10, said shaft, 29$^a$, carrying a worm, 36, which meshes with the worm gear, 37, journaled on a stud, 10$^g$, which projects from the inner side of the mounting member, 10. The gear, 37, carries a crank wrist, 38, which is connected by a link, 39, with a lever arm, 40, on the wiper operating shaft, 41. Said shaft, 41, is journaled in a sleeve, 42, mounted rigidly in the mounting plate, 10, and projecting outwardly therefrom and being of sufficient length to extend past the bosses, 10$^a$, and through the entire thickness of the upper bar, 50, of the windshield frame, said sleeve having suitable journal bearing bushings, 42$^a$ and 42$^b$, at its opposite ends for journaling the shaft, 41. The length of the lever arm, 40, is enough greater than the radial distance of the crank wrist, 38, from the axis of the gear wheel, 37, so that the complete rotation of the gear wheel serves only to rock the shaft, 41, through an angle somewhat less than 180 degrees. Upon the upper bar, 50, of the windshield frame, there is mounted at a distance longitudinally of said bar from the sleeve, 42, a rock shaft, 60, and to the outer ends of the shaft, 41, and said rock shaft, 60, there are secured parallel lever arms, 61—61, which depend in front of the windshield glass as seen in Figure 1; and to the lower ends of these two depending arms, there is attached pivotally, the wiper bar, 65, having a suitable flexible wiping lip, 65$^a$, which is held against the outer surface of the windshield glass for wiping the same, as said wiper bar is carried at all times in a horizontal position through the path indicated by dotted lines, 67, on Figure 1, whereby the face of the windshield is cleaned over substantially its entire extent except the lower corners outside the sleeve of the bar. For attaching the wiper-carrying arms and facilitating such attachment to the shafts, 41, and 60, respectively, said carrying arms are square and there is attached to each of said shafts, 41 and 60, a connector consisting of a bar, 70, folded to form at its upper end an angular U-shaped hook, 71, which is apertured as seen at 71$^a$ through both limbs of the U and which has a set screw, 72, set through the bend of the U for clamping the wiper-carrying arm, 61, against the shaft, the shaft being flatted at both sides for seating at one side against the bar, 61, and the other side engaging the set screw, 72; whereby the connector, 70, is made fast at the same time both to the shaft and to the bar, 61. It is contemplated that the wiper will be set snugly and with proper pressure against the glass, by first slacking the set screw, 72, and then sliding the connector, 70, on the shaft to a point at which it is judged the pressure of the wiper on the glass is adequate and not excessive to permit this proper operation.

For nice adjustment of the tension the connector, 70, has a depending arm from whose lower end a lug, 70$^a$, projects across in front of the bar, 61, and a tension screw, 75, set through this lug against said bar being screwed in more or less presses the wiper more or less firmly against the glass.

If it is not desired to wipe the entire surface of the glass, but only to cleanse a limited area directly in front of the driver, the rock shaft, 60, and the arm, 61, thereon may be dispensed with, and the other arm, 61, which is carried by the shaft, 41, may have a wiper, 76, pivotally attached at approximately the middle point of the length of the wiper to said arm, 61, as seen in Figure 2; any convenient means for pivotally attaching the wiper to the arm to adapt the wiper to accommodate itself to the plane of the glass may be employed and the particular pivotal connection shown requires no specific description.

I claim:—

1. In a device of the class indicated comprising a casing and motor mechanism therein, adapted to be mounted on the frame of the windshield to be served, the motor mechanism comprising a rocking shaft which protrudes forwardly from the casing and extends forward past the plane of the windshield; a wiper arm suspended from the forward end of said rocking shaft, the means of suspension being a bar folded at its upper end to form a hook embracing the shaft and apertured at the hook portion to admit the wiper arm crosswise of the shaft and screw means at the hook portion for clamping together the wiper arm and the shaft, the lower end of said bar having means for engaging the wiper arm at a substantial distance from the hook.

2. A device of the class indicated, comprising a casing and motor mechanism therein, adapted to be mounted on the frame of the windshield to be served, the motor mechanism comprising a rocking shaft which protrudes forwardly from the casing and extends forward past the plane of the windshield; a wiper arm suspended from the forward end of said rocking shaft, the means of suspension being a bar folded to form at its upper end a U-shaped hook, said hook being apertured to admit the wiper arm through both limbs of the U, a set screw at the bend of the U to clamp the wiper arm against the shaft, the lower end of said bar having means for engaging the wiper arm at a substantial distance from the hook.

3. In a device of the class indicated, comprising a casing and motor mechanism therein adapted to be mounted on the frame of the windshield to be served, the motor mechanism comprising a rocking shaft which protrudes forwardly from the casing and extends forward past the plane of the windshield; a wiper arm suspended from the forward end of said rocking shaft the means of suspension being a bar folded at its upper end to form a hook embracing the shaft and apertured at the hook portion to admit the wiper arm crosswise of the shaft; screw means at the hook portion for clamping together the wiper arm and the shaft, and adjustable tensioning means at the lower end of the bar for engaging the wiper arm at a substantial distance from the hook.

4. In the construction defined in claim 2, foregoing, the means for engaging the wiper arm at the lower end of the suspending device, including a lug projecting transversely from said suspending bar, and a set screw in said lug for engaging the wiper arm for adjustment toward and from the windshield.

In testimony whereof, I have hereunto set my hand at Chicago, Illinois, this 6 day of February, 1924.

FREDERIK G. WHITTINGTON.